US005142306A

United States Patent [19]

Arahara et al.

[11] Patent Number: 5,142,306

[45] Date of Patent: Aug. 25, 1992

[54] IMAGE FORMING APPARATUS AND METHOD FOR APPLYING AN ADHESIVE RECORDING MATERIAL TO AN ELECTRODE

[75] Inventors: Kohzoh Arahara, Kawasaki; Osamu Hoshino, Atsugi; Noboru Tohyama, Kawasaki; Toshiya Yuasa, Mitaka; Norihiko Koizumi; Hiroshi Tanioka, both of Yokohama, all of Japan

[73] Assignee: Canon Kabushiki Kaisha, Tokyo, Japan

[21] Appl. No.: 499,579

[22] Filed: Mar. 27, 1990

Related U.S. Application Data

[63] Continuation of Ser. No. 301,146, Jan. 25, 1989, abandoned.

[30] Foreign Application Priority Data

| | | | |
|---|---|---|---|
| Jan. 25, 1988 | [JP] | Japan | 63-012617 |
| Mar. 23, 1988 | [JP] | Japan | 63-070299 |
| Oct. 4, 1988 | [JP] | Japan | 63-251465 |

[51] Int. Cl.[5] B41J 2/005; B41J 2/495; B41J 2/40; B41M 1/06; B41F 7/00; G01D 15/16

[52] U.S. Cl. 346/140 R; 346/1.1; 101/465; 101/466; 101/489; 101/DIG. 37; 101/450.1

[58] Field of Search 346/140 R, 1.1; 101/489, 465, 466, DIG. 37, 450.1

[56] References Cited

U.S. PATENT DOCUMENTS

| | | | |
|---|---|---|---|
| 2,892,709 | 6/1959 | Mayer | 346/153.1 |
| 3,946,671 | 3/1976 | Metcalfe | 101/489 |
| 4,068,588 | 1/1978 | Nakano | 101/451 |
| 4,080,897 | 3/1978 | Gundlach | 101/451 |
| 4,387,382 | 6/1983 | Kohashi | 346/140 R |
| 4,555,320 | 11/1985 | Castegnier . | |
| 4,764,264 | 8/1988 | Castegnier . | |
| 4,838,940 | 6/1989 | Kan | 106/20 |
| 4,855,763 | 8/1989 | Kan et al. . | |
| 4,881,084 | 11/1989 | Arahara et al. | 346/1.1 |
| 4,920,361 | 4/1990 | Arahara et al. | 346/140 R |
| 4,945,833 | 8/1990 | Arahara et al. | 101/450.1 |
| 4,962,389 | 10/1990 | Kan et al. | 346/140 R |
| 5,008,690 | 4/1991 | Kolzumi et al. | 346/140 R |
| 5,017,223 | 5/1991 | Kobayashi et al. | 106/20 |
| 5,019,835 | 5/1991 | Arahara et al. | 346/1.1 |

FOREIGN PATENT DOCUMENTS

| | | |
|---|---|---|
| 0160979 | 11/1985 | European Pat. Off. . |
| 0296640 | 12/1988 | European Pat. Off. . |
| 0322816 | 7/1989 | European Pat. Off. . |

*Primary Examiner*—Benjamin R. Fuller
*Assistant Examiner*—Scott A. Rogers
*Attorney, Agent, or Firm*—Fitzpatrick, Cella, Harper & Scinto

[57] ABSTRACT

An image forming apparatus and method for forming an image includes a recording material which changes its adhesiveness in response to the polarity of the voltage applied thereto. Such a recording material can include negatively or positively changeable or inorganic particles, gas-generating solvents, a substance having a gel or sol state, and a dissociative electrolyte. The recording material is positioned between a pair of electrodes. At least one of the electrodes includes an electroconductive member and a pattern comprising an insulating material disposed on the electroconductive member. A voltage is then applied between the pair of electrodes to attach the recording material to one of the electrodes. Also provided is a pressure applicator for transferring to a transfer-receiving medium the recording material attached to the electrode.

4 Claims, 3 Drawing Sheets

IMAGE FORMING APPARATUS AND METHOD FOR APPLYING AN ADHESIVE RECORDING MATERIAL TO AN ELECTRODE

This application is a continuation of application Ser. No. 301,146 filed Jan. 25, 1989, which is now abandoned.

FIELD OF THE INVENTION AND RELATED ART

The present invention relates to an image forming method, and a recording material and an image forming apparatus used therefor.

As peripheral equipment for recording used in conjunction with a computer, etc., there have been known various printers utilizing various recording systems, such as laser beam printers, ink-jet printers, thermal transfer printers, wire dot printers and daisy-wheel printers.

With respect to such recording systems, our research group has proposed a recording method wherein a pattern of adhesiveness is chemically imparted to a specific ink and recording is effected by utilizing the resultant difference between the adhesiveness and non-adhesiveness in the ink (Japanese Patent Application No. 175191/1986, corresponding to U.S. Pat. Application Ser. No. 075,045).

This recording method comprises:

providing a fluid ink which is capable of forming a fluid layer, substantially non-adhesive and capable of being imparted with an adhesiveness on application of energy, forming a layer of the fluid ink on an ink-carrying member, applying a pattern of energy corresponding to a given image signal to the ink layer to form an adhesive pattern of the ink, and transferring the adhesive pattern of the ink to a transfer-receiving medium to form thereon an ink pattern corresponding to the energy pattern applied.

However, the above-mentioned recording method is not necessarily suitable for printing for mass-producing printed matter, in view of the printing cost, etc.

On the other hand, as technique suitable for the mass-production printing, there have been known various printing processes such as planographic printing, letterpress printing, and gravure printing. However, in these conventional printing process, the production of a printing plate requires complicated steps and the patterning of ink requires dampening water, whereby the handling thereof is very troublesome. Further, because the adhesion property of the ink is easily affected by temperature or humidity, the above-mentioned printing processes are lacking in environmental stability. Accordingly, it is difficult to apply conventional printing processes to the peripheral recording equipment used in conjunction with a computer, etc.

Our research group has also proposed some printing processes including one using a solid ink (Japanese Patent Application No. 274250/1987 and No. 291821/1987 corresponding to U.S. Pat. Application filed on Nov. 14, 1988), and one wherein an ink is supplied to a printing plate by changing the pH value in the ink (Japanese Patent Application No. 325592/1987 corresponding to U.S. Pat. Application filed on Dec. 21, 1988.

SUMMARY OF THE INVENTION

A principal object of the present invention is, in view of the above-mentioned problems, to provide an image forming method which is easy to perform, to provide an image forming apparatus which does not require much maintenance, and to provide a recording material that has excellent environmental stability.

According to the present invention, there is provided an image forming method comprising the steps of:

providing a recording material capable of changing its adhesiveness corresponding to the polarity of a voltage applied thereto;

supplying the recording material between a pair of electrodes; and applying a voltage between the pair of electrodes thereby to attach the recording material to either one of the pair of electrodes.

The present invention also provides a recording material, comprising: a liquid dispersion medium and fine particles dispersed therein; and at least a part of the fine particles comprising charged or chargeable fine particles.

The present invention also provides an image forming apparatus, comprising:

a pair of electrodes at least one of which has a pattern comprising an electroconductive portion and an insulating portion;

means for supplying a recording material between the pair of electrodes;

means for applying a voltage between the pair of electrodes; and pressure application means for transferring to a transfer-receiving medium the recording material attached to the electrode having the pattern corresponding to the pattern thereof under application of the voltage.

These and other objects, features and advantages of the present invention will become more apparent upon a consideration of the following description of the preferred embodiments of the present invention taken in conjunction with the accompanying drawings, wherein like reference numerals denote like parts.

DETAILED DESCRIPTION OF THE INVENTION

In the image-forming method according to the present invention, there is utilized the property of an ink such that when a voltage is applied thereto by means of a pair of electrodes, an ink having adhesiveness is caused to have non-adhesiveness to the electrode, or an ink having substantially no adhesiveness is caused to have adhesiveness to the electrode. In the present invention, based on such a property, an image is formed by using a printing plate as one of the above-mentioned pair of electrodes.

In the present invention, an ink satisfying the following property may preferably be used as the above-mentioned substantially non-adhesive ink.

Non-adhesiveness

On the surface of a sample ink (reflection density: 1.0 or larger) held in a container, a stainless steel plate of 5 cm×5 cm in size coated with platinum plating is, after the reflection density thereof is measured, placed gently and is left standing as it is for 1 min. in an environment of a temperature of 25° C. and a moisture of 60%. Then, the stainless steel plate is gently peeled off from the surface of the ink and then the reflection density of the stainless steel plate surface is measured to determine the increase in reflection density of the stainless steel plate. Through this measurement, the ink used in the present invention should preferably show substantially no transfer of its coloring content. More specifically, the increase in the reflection density is preferably 0.3 or less, but it is more preferable 0.1 or if it is less, when the above-mentioned ink per se has a reflection density of 1.0 or larger.

Hereinbelow, the present invention is described with reference to accompanying drawings.

Figure 1:
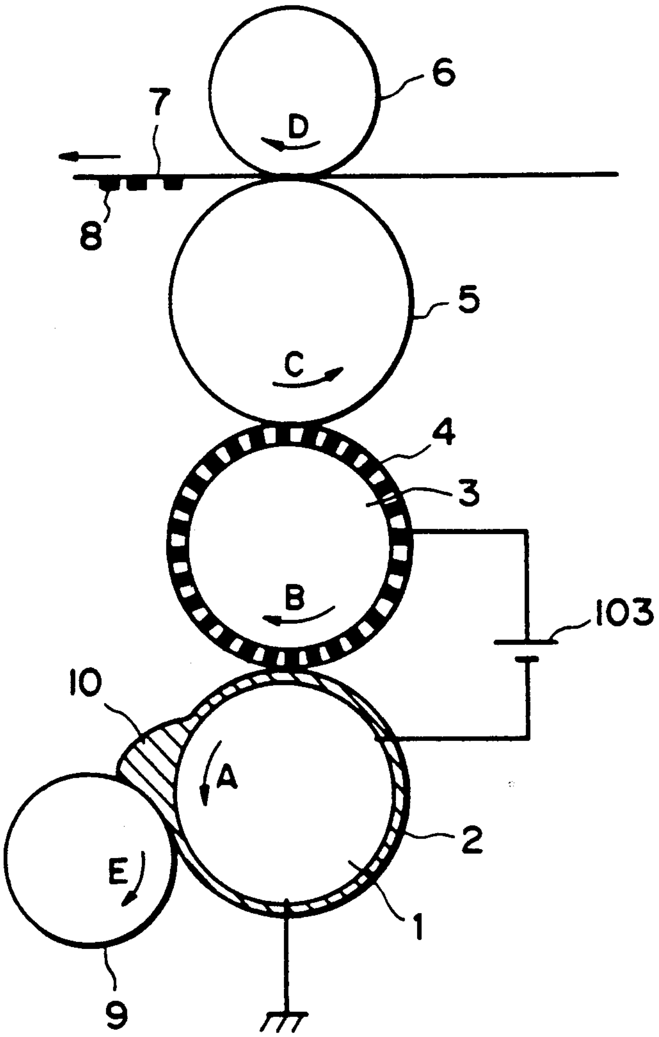
FIG. 1 is a schematic side sectional view of an apparatus for practicing the image forming method according to the present invention.

Referring to FIG. 1, an ink-carrying roller 1 is a cylindrical member rotating in the arrow A direction. The roller 1 may preferably comprise an electroconductive material such as aluminum, copper and stainless steel. Onto the cylindrical ink-carrying surface of the roller 1, an ink 2 as a recording material is supplied by means of a coating roller 9 rotating in the arrow E direction to be formed into a layer having a uniform thickness.

The cylindrical ink-carrying surface of the roller 1 may be composed of any material, as far as it is possible to form a desired layer of the ink 2 when it is rotated in the arrow A direction. More specifically, the roller surface may preferably be composed of a conductive material such as metal, including stainless steel. The ink-carrying roller 1 is connected to one of the terminals of the DC power supply 103.

The surface composed of such a material of the ink-carrying roller 1 can be smooth but may preferably be a roughened one to an appropriate extent (e.g., a roughness of the order of 1S according to JIS B 0601) so as to enhance its conveying and carrying characteristics.

In contact with the ink layer 2 disposed on the ink-carrying roller 1, a printing plate 4 wound about a plate roller 3 is disposed. The printing plate 4 may , for example, comprise a substrate 4*a* comprising an electroconductive material such as metal, and a desired pattern 4*b* disposed thereon comprising an insulating material, as shown in FIG. 2.

Figure 2:
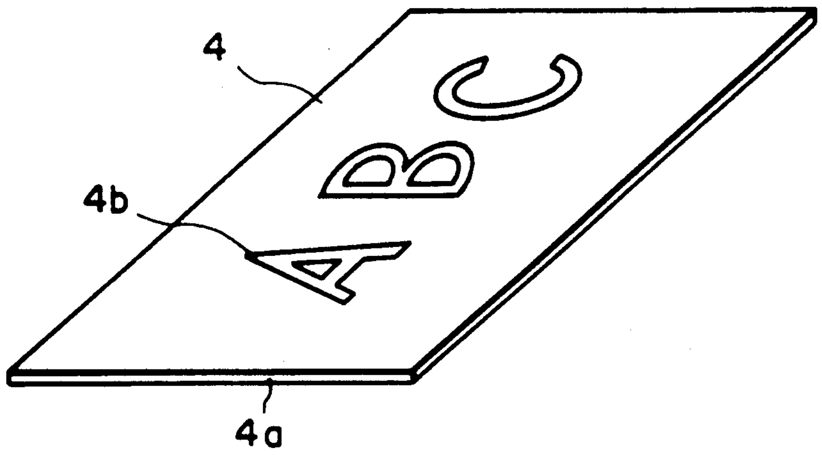
FIG. 2 is a schematic perspective showing an embodiment of the printing plate usable in the apparatus according to the present invention.

Referring to FIG. 2, the material constituting substrate 4*a* may include: metals such as aluminum, copper, stainless steel, platinum, gold, chromium, nickel, phosphor bronze, and carbon; electroconductive polymers; and dispersions obtained by dispersing metal filler, etc., in various polymers. The material constituting the pattern 4*b* may include: materials for thermal transfer recording mainly comprising waxes or resins, electrophotographic toners; and natural or synthetic polymers such as vinyl polymer. In the case where a solid recorded image (i.e., a recorded image which is entirely filled with an ink) is formed, a printing plate 4 without a pattern 4*b* may be used.

Referring again to FIG. 1, when a voltage is applied between the printing plate 4 and the ink-carrying roller 1 by means of the power supply 103, the adhesiveness of a portion of the ink 2 contacting the electroconductive portion of the printing plate 4 is changed, and the ink 2 is caused to selectively or patternwise adhere to the printing plate 3 corresponding to the resultant difference in the above-mentioned adhesiveness, thereby to form an ink pattern thereon.

The voltage applied from the power supply 103 may practically be a DC voltage of 3–100 V, and preferably 5–80 V. When an AC bias voltage preferably of 10–100 V in the form of a high frequency, preferably of 10 Hz–100 KHz, is further applied, the image quality may be increased in sharpness.

Incidentally, while the printing plate 4 side is an anode and the ink-carrying roller 1 side is a cathode in FIG. 1, the printing plate 4 side may be a cathode and the ink-carrying roller 1 side may be an anode depending on the property or state of the ink used in combination therewith.

In the present invention, it is preferred that the voltage from the power supply 103 is applied between the rotation axes of the plate roller 3 and the ink-carrying roller 1.

The thickness of the layer of the ink 2 formed on the ink-carrying roller 1 can vary depending on various factors including the gap between the ink-carrying roller 1 and the coating roller 9, the fluidity or viscosity of the ink 2, the surface material and roughness thereof of the ink-carrying roller 1, and the rotational speed of the roller 1, but may preferably be 0.001–100 mm as measured at an ink transfer position where the roller 1 is disposed opposite to the pattern plate 4 on the plate roller 3.

If the layer thickness of the ink 2 is below 0.001 mm, it is difficult to form a uniform ink layer on the ink-carrying roller 1. On the other hand, if the ink layer thickness exceeds 100 mm, it becomes difficult to convey the ink 2 while keeping a uniform peripheral speed of the surface portion on the side contacting the printing plate 4 having the electroconductive pattern, and further it becomes difficult to pass a current between the pattern plate 4 and the ink-carrying roller 1.

The thus formed ink pattern on the printing plate 4 is then transferred to a blanket cylinder 5, as an intermediate transfer medium, which rotates in the arrow C direction while contacting the printing plate 4 under pressure. Further, the ink pattern disposed on the blanket cylinder 5 is transferred to a recording medium (or a medium to be recorded) 7 such as a sheet of paper, cloth or metal, passing between the blanket cylinder 5 and an impression cylinder 6, as a pressure-applying means, which rotates in the arrow D direction while contacting the blanket cylinder 5, whereby an image 8 corresponding to the above-mentioned ink pattern is formed on the recording medium 7.

It is also possible that the ink pattern formed on the printing plate 4 is directly transferred to the recording medium 7 in some cases without providing the blanket cylinder 5 as an intermediate transfer medium. However, when the blanket cylinder 5 is provided, the printing plate 4 may be prevented from wearing or deteriorating on the basis of the material constituting the blanket cylinder 5, and an image 8 having the same pattern as that of the printing plate 4 may be obtained on the recording medium 7.

Figure 3:
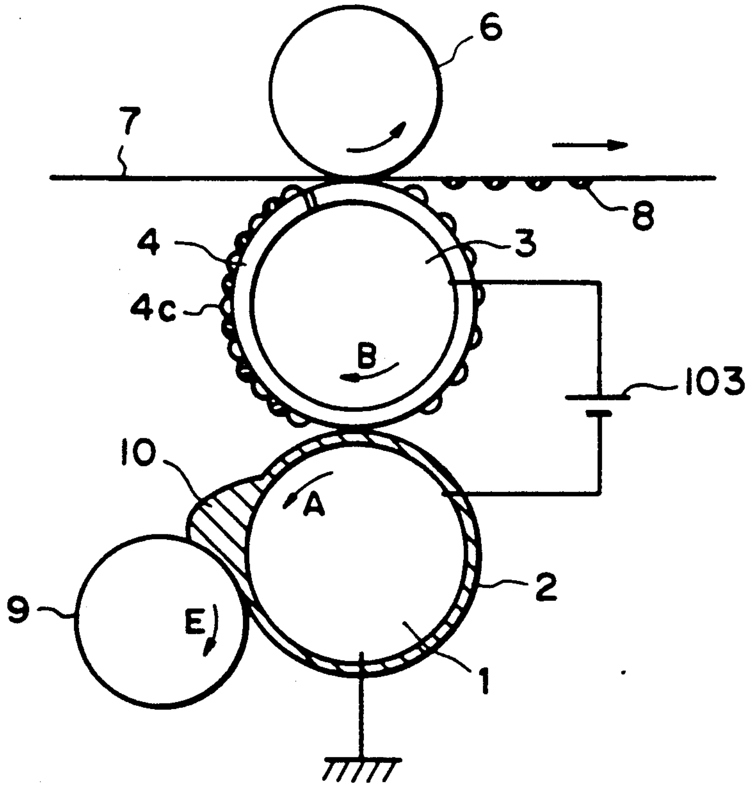
FIGS. 3 and 4 are schematic side sectional views of another apparatus for practicing the image forming method according to the present invention.

FIG. 3 shows another embodiment of the present invention. In the embodiment as shown in FIG. 3, the printing plate 4 comprises a printed substrate comprising a metal plate and a pattern of an insulating photoresist 4c disposed thereon. In such an embodiment, the ink adheres to the portion of the metal plate without the photoresist, and the ink selectively attached to the printing plate 4 in this manner is then transferred to a recording paper 7 to thereby form a recorded image 8 thereon. When an ink initially having an adhesiveness is used, the ink adheres to a portion of the photoresist to form an ink pattern.

Figure 4:
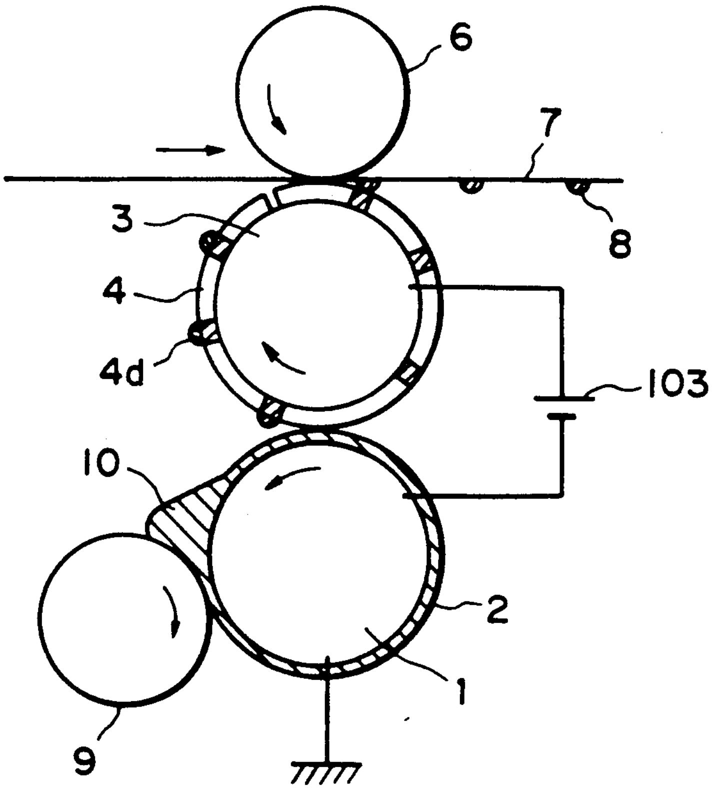

FIG. 4 shows another embodiment of the present invention. In this embodiment, the printing plate 4 comprises an electroconductive substrate and a photoconductor (or photoconductive material) disposed thereon. More specifically, in such printing plate 4, the photoconductor is patternwise irradiated with light to form a portion 4d having persistent conductivity.

Preferred examples of such photoconductor may include: gelatin-silver halide, a shell coated with zinc oxide, selenium, amorphous silicon, organic photoconductors, etc. Incidentally, the persistent conductivity of a photoconductor is specifically explained in the Chapter IV of "Electrophotography" (1965) written by R. M Schaffert (published by Forcal Press Limited).

In addition, the printing plate can be one comprising an electroconductive substrate and an insulating film disposed thereon wherein a conductivity pattern has been formed by electrical discharge destruction; or one comprising an electroconductive substrate and a photographic image disposed thereon having a conductive pattern of silver obtained by deposition of silver particles.

In the embodiments as shown in FIGS. 1, 3 and 4, the printing plate 4 is wound around the cylindrical plate roller 3, but it is also possible that the printing plate 4 in the form of a flat plate is used as such as an electrode, an ink applied onto the printing plate 4 is sandwiched between the plate 4 and an opposite electrode, and a voltage is applied to the ink in such a state, whereby an ink pattern is formed on the printing plate 4.

As described hereinabove, in the image-forming method according to the present invention, a specific ink is supplied to a portion between an electrode (printing plate) having a desired pattern and an opposite electrode, and a DC voltage is applied between the above-mentioned pair of electrodes, to change the adhesiveness of the ink corresponding to the pattern of the above-mentioned electrode.

Accordingly, the image-forming method according to the present invention may be classified into the following two modes depending on the property of an ink used therein.

(I) A mode wherein the ink has an adhesiveness under no voltage application, and the ink loses its adhesiveness when a voltage is applied thereto. In such a mode, the ink adheres to the insulating portion of a printing plate to form a desired ink pattern, which is then transferred to a transfer-receiving medium such as a recording medium or an intermediate transfer medium to form thereon a desired image.

(II) A mode wherein the ink has substantially no adhesiveness under no voltage application, and the ink has an adhesiveness when a voltage is applied thereto. In such a mode, the ink adheres to the electroconductive portion of a printing plate to form a desired ink pattern, which is then transferred to a recording medium, etc. to form thereon a recorded image.

Hereinbelow, there will be described an ink to be used in the image-forming method according to the present invention.

Whether the ink is initially caused to have an adhesiveness or not as described in the above-mentioned mode (I) or mode (II) may easily be controlled by regulating the composition or proportion of materials constituting the ink, or the kinds of these materials.

On the other hand, there may be utilized some embodiments as follows, with respect to mechanisms wherein an adhesive ink is converted into a nonadhesive state or a non-adhesive ink is converted into an adhesive state under the application of a voltage.

(1) An embodiment wherein the adhesiveness of the ink is changed on the basis of Coulomb force under voltage application.

In such an embodiment, an ink basically comprising inorganic or organic fine particles and a liquid dispersion medium is used, and a difference in chargeability of the fine particles is utilized.

More specifically, in the case where an ink is prepared so that it initially has an adhesiveness and negatively chargeable fine particles (i.e., those capable of being easily charged negatively) are contained in the ink, the ink on the cathode side becomes non-adhesive to the cathode when a voltage is applied to the ink. In a case where an ink is prepared so that it initially has an adhesiveness and positively chargeable fine particles (i.e., those capable of being easily charged positively) are contained in the ink, the ink on the anode side becomes non-adhesive to the anode when a voltage is applied to the ink.

Alternatively, an ink is prepared so that it is initially non-adhesive and negatively chargeable fine particles are contained therein, the ink on the anode side becomes adhesive to the anode under voltage application. In the case where an ink is prepared so that it is non-adhesive and positively chargeable fine particles are contained therein, the ink on the cathode side becomes adhesive to the cathode under voltage application.

(2) An embodiment wherein an ink is subjected to electrolysis to generate a gas on the basis of electric conduction due to voltage application, whereby the adhesiveness of the ink is changed.

In an embodiment, an ink is prepared so that it initially has an adhesiveness, and the ink is caused to generate a gas in the neighborhood of one electrode under voltage application, whereby the ink becomes nonadhesive to the electrode due to the gas.

In order to cause the ink to generate a gas due to electrolysis, a solvent such as water, alcohol and glycol; or a solvent containing an electrolyte such as sodium chloride and potassium chloride dissolved therein, is contained in the ink. The electrical resistance of the ink may preferably be as low as possible. More specifically, the volume resistivity of the ink may preferably be $10^5$ ohm.cm or below, and more preferably $10^4$ ohm.cm or below. If the volume Lresistivity exceeds $10^5$ ohm.cm, the quantity of electric conduction becomes too small, or a high voltage is required in order to prevent a decrease in the quantity of electrical conduction.

(3) An embodiment wherein a crosslinked structure of an ink or the dissociative state of an electrolyte contained therein is changed by an electrochemical reaction on the basis of electrical conduction due to voltage application, whereby the adhesiveness of the ink is changed.

In such an embodiment, the ink may be prepared so that it is initially non-adhesive, or initially has an adhesiveness. When the ink is prepared so that it initially has substantially no adhesiveness, at least a part of the cross-linked structure is changed or destroyed, and the ink is converted from a gel-like state to a sol-like state, whereby the ink is imparted with an adhesiveness. Alternatively, the dissociative state of the electrolyte constituting the ink is changed whereby the ink is imparted with an adhesiveness.

When the ink is prepared so that it initially has an adhesiveness, the adhesive ink becomes nonadhesive adhesive by a mechanism which is the reverse of that mentioned above.

It is considered that the mechanism of the image-forming method according to the present invention is any one of the above-mentioned three mechanisms (1), (2) and (3). It is possible that the mechanism of the image-forming method is a combination of two or more of the above-mentioned three mechanisms.

Incidentally, when there is used an ink which is converted from an adhesive state to a non-adhesive state under voltage application, with respect to a portion of an ink layer not supplied with a voltage, almost the whole ink layer along the thickness direction is transferred to a printing plate (hereinafter such transfer of an ink is referred to as "bulk transfer"). On the other hand, in the case of an ink which is converted from a non-adhesive state to an adhesive state, it is supposed that there occurs the above-mentioned bulk transfer or a partial transfer wherein a portion of the surface layer of the ink is transferred, depending on the relationship among the adhesion forces at the respective interfaces and the cohesive force of the ink.

Hereinbelow, there is described an ink wherein the adhesiveness is changed by the above-mentioned mechanism (1) and (2).

The ink used in the present invention may be one having an adhesiveness or one having substantially no adhesiveness under no voltage application, but the ink capable of causing bulk transfer is preferred in view of the importance of image density, because such ink may easily provide a uniform image density.

If the ink according to the present invention is a liquid having a low viscosity such as water and alcohol, the cohesive force is weak, whereby it is difficult to obtain a suitable adhesiveness.

More specifically, the ink according to the present invention may preferably satisfy at least one of the following properties.

(1) Adhesiveness

A sample ink (reflection density: 1.0 or larger) is caused to adhere to a stainless steel plate of 1 cm × 1cm in size, coated with platinum plating which is vertically disposed, so that a 2 mm-thick ink layer is formed on the stainless steel plate, and is left standing as it is for 5 sec. in an environment of a temperature of 25° C. and a moisture of 60%. then, the height of the ink layer is measured. Through this measurement, the ink according to the present invention may preferably be held on the stainless steel plate substantially. More specifically, the above-mentioned height of the ink layer may preferably be 50% or higher, more preferably 80% or higher, based on the original height thereof.

(2) Adhesiveness under no voltage application

A 2 mm-thick layer of a sample ink is sandwiched between two stainless steel plates each of 1 cm × 1 cm in size, coated with platinum plating which are vertically disposed, and the stainless steel plates are separated from each other at a peeling speed of 5 cm/sec under no voltage application. Then, the areas of both plates covered with the ink are respectively measured. Through the measurement, in this ink according to the present invention, the respective plates may preferably show substantially the same adhesion amount of ink. More specifically, each plate may preferably show an area proportion of 0.7–1.0, in terms of the proportion of the area measured above to the area of the plate which has originally been covered with the above-mentioned 2 mm-thick ink layer.

(3) Adhesiveness under voltage application

A sample ink (reflection density: 1.0 or larger) is applied on a stainless steel plate of 1 cm × 1 cm coated with platinum plating to form an about 2 mm-thick ink layer, and another stainless steel plate coated with platinum plating having the same size as described above is, after the reflection density thereof is measured, disposed on the ink layer, and these two stainless steel plates are vertically disposed. Then, a voltage of +30 V was applied between the above-mentioned two stainless steel plates sandwiching the 2 mm-thick ink layer, while one of the stainless steel plates is used as a cathode (earth) and the other is used as an anode. The stainless steel plates are separated from each other at a peeling speed of 5 cm/sec in an environment of a temperature of 25° C. and a moisture of 60%, while applying the voltage in the above-mentioned manner, and then the reflection density of each stainless steel plate surface is measured to determine the increase in reflection density of the stainless steel plate. Through this measurement, in the ink according to the present invention, it is preferred that the coloring content of the ink is not substantially transferred to one of the above-mentioned two electrodes, and the ink selectively adheres to the other electrode. More specifically, with respect to the electrode to which substantially no ink adheres, the increase in the reflection density may preferably be 0.3 or less, more preferably 0.1 or less, when the above-mentioned ink per se has a reflection density of 1.0 or larger.

The ink according to the present invention of which adhesiveness is changed by the above-mentioned mechanism (1) and (2) basically comprises inorganic or organic fine particles and a liquid dispersion medium. The fine particles contained in the ink improve the cutting of the ink and enhance the image resolution provided thereby. The ink material according to the present invention is an amorphous solid in the form of a colloid sol and is a non-Newtonian fluid with respect to its fluidity.

When the ink adhesiveness is changed due to a Coulomb force, charged or chargeable fine particles may be used as the entirety or a part of the above-mentioned mentioned fine particles and are mixed or kneaded in a liquid dispersion medium as described hereinafter, e.g., by means of a homogenizer, a colloid mill or an ultrasonic dispersing means, whereby charged particles are obtained.

The "charged particle" used herein refers to a particle which has a charge prior to the kneading. The "chargeable particle" refers to a particle which can easily be charged by triboelectrification.

Examples of the particles to be supplied with a positive charge may include: particles of a metal such as Au, Ag and Cu; particles of a sulfide such as zinc sulfide ZnS, antimony sulfide $Sb_2S_3$, potassium sulfide $K_2S$, calcium sulfide CaS, germanium sulfide GeS, cobalt sulfide CoS, tin sulfide SnS, iron sulfide FeS, copper sulfide $Cu_2S$, manganese sulfide MnS, and molybdenum sulfide $Mo_2S_3$; particles of a silicic acid or salt thereof such as orthosilicic acid $H_4SiO_4$, metasilicic acid $H_2Si_2O_5$, mesortisilicic acid $H_4Si_3O_3$, mesotetrasilicic acid $H_6Si_4O_{11}$; polyamide resin particles; polyamide-imide resin particles; etc.

Examples of the particles to be supplied with a negative charge may include: iron hydroxide particles, aluminum hydroxide particles, fluorinated mica particles, polyethylene particles, motmorillonite particles, fluorine-containing resin particles, etc.

Further, polymer particles containing various charge-controlling agents used as electrophotographic toners (positively chargeable or negatively chargeable) may be used for such purpose.

The above-mentioned fine particles may generally have an average particle size of 100 microns or smaller, preferably 0.1–20 microns, and more preferably 0.1–10 microns. The fine particles may generally be contained ink in an amount of 1 wt. part or more, preferably 3–90 wt. parts, and more preferably 5–60 wt. parts, per 100 wt. parts of the ink.

Examples of the liquid dispersion medium used in the present invention may include: ethylene glycol, propylene glycol, diethylene glycol, triethylene glycol, tetraethylene glycol, polyethylene glycol (weight-average molecular weight: about 100–1,000) ethylene glycol monomethyl ether, ethylene glycol monoethyl ether, ethylene glycol monobutyl ether, methyl carbitol, ethyl carbitol, butyl carbitol, ethyl carbitol acetate, diethyl carbitol, triethylene glycol monomethyl ether, triethylene glycol monoethyl ether, propylene glycol monomethyl ether, glycerin, triethanolamine, formamide dimethylformamide, dimethylsulfoxide N-methyl-2-pyrrolidone, 1,3-dimethylimidazolidinone, N-methylacetamide, ethylene carbonate, acetamide, succinonitrile, dimethylsulfoxide, sulfolane, furfuryl alcohol, N,N-dimethylformamide, 2-ethoxyethanol, hexamethylphosphoric amide, 2-nitropropane, nitroethane, γ-butyrolactone, propylene carbonate 1,2,6-hexanetriol, dipropylene glycol, hexylene glycol, etc. These compounds may be used singly or as a mixture of two or more species as desired. The liquid dispersion medium may preferably be contained in an amount of 40–95 wt. parts, and more preferably 60–85 wt. parts, per 100 wt. parts of the ink.

In a preferred embodiment of the present invention, in order to control the viscosity of the ink, a polymer soluble in the above-mentioned liquid dispersion medium may be contained in an amount of 1–90 wt. parts, more preferably 1–50 wt. parts, and most preferably 1–20 wt. parts, per 100 wt. parts of the ink material.

Examples of such a polymer include: plant polymers, such as guar gum, locust bean gum, gum arabic, tragacanth, carrageenah, pectin, mannan, and starch; microorganism polymers, such as xanthane gum, dextrin, succinoglucan, and curdran; animal polymers, such as gelatin, casein, albumin, and collagen; cellulose polymers such as methyl cellulose, ethyl cellulose, and hydroxyethyl cellulose; starch polymers, such as soluble starch, carboxymethyl starch, and methyl starch; alginic acid polymers, such as propylene glycol alginate, and alginic acid salts; other semisynthetic polymers, such as derivatives of polysaccharides; vinyl polymers, such as polyvinyl alcohol, polyvinylpyrolidone, polyvinyl methyl ether, carboxyvinyl polymer, and sodium polyacrylate; and other synthetic polymers, such as polyethylene glycol, ethylene oxide-propylene oxide block copolymer; alkyd resin, phenolic resin, epoxy resin, aminoalkyd resin, polyester resin, polyurethane resin, acrylic resin, polyamide resin, polyamide-imide resin, polyester-imide resin, and silicone resin; etc. These polymers may be used singly or in mixture of two or more species, as desired. Further, there can also be used grease such as silicone grease, and liquid polymer such as polybutene.

In a case where the adhesiveness of the ink is changed by the generation of a gas due to electrolysis, the liquid dispersion medium may preferably comprise: water, an alcohol such as methanol and ethanol; a solvent having a hydroxyl group such as glycerin, ethylene glycol and propylene glycol; or a solvent wherein an electrolyte such as sodium chloride and potassium chloride is dissolved. The contents of the liquid dispersion medium and fine particles are the same as described above.

Particularly, water or an aqueous solvent may preferably be used as the liquid dispersion medium, because hydrogen is liable to be generated at the cathode side. When water and another liquid dispersion medium are mixed, the water content may preferably be 1 wt. part or more, and more preferably 5–99 wt. parts, per 100 wt. parts of the ink.

In the case of the ink capable of generating a gas due to electrolysis, the fine particles contained in the ink may preferably be, e.g., silica, carbon fluoride, titanium oxide or carbon black, in addition to those as described hereinabove.

In a preferred embodiment of the present invention, in view of the viscoelastic characteristic of the ink, the entirety or a part of the fine particles comprise swelling particles (i.e., particles capable of swelling) which are capable of retaining the above-mentioned liquid dispersion medium therein.

Examples of such swelling particles may include: fluorinated mica such as Na-montmorillonite, Ca-montmorillonite, 3-octahedral synthetic smectites, Na-hectorite, Li-hectorite, Na-taeniolite, Na-tetrasilicic mica, and Li-taeniolite; synthetic mica silica, etc.

The above-mentioned fluorinated mica may be represented by the following general formula (1).

$$W_{1-\frac{1}{3}}(X.Y)_{2.5-3}(Z_4O_{10})F_2 \quad (1)$$

wherein W denotes Na or Li; X and Y respectively denote an ion having a coordination number of 6, such as $Mg^{2+}$, $Fe^{2+}$, $Ni^2$, $Mn^{2+}$, $Al^{3+}$, and $Li+$; Z denotes a positive ion having a coordination number of 4 such as $Al^{3+}$, $Si^{4+}$, $Ge^{4+}$, $Fe^{3+}$, $B^{3+}$ or a combination of these including, e.g., $(Al^{3+}/Si^{4+})$.

The swelling particles, in their dry state, may preferably have an average particle size of 0.1–20 microns, more preferably 0.8–15 microns, and most preferably 0.8–8 microns. The content of the swelling particles can be the same as described above with respect to the fine particles, but may more preferably be 8–60 wt. parts per 100 wt. parts of the ink. It is also preferred to use swelling particles having a charge on their surfaces.

The ink according to the present invention may contain as desired, a colorant comprising a dye or pigment generally used in the field of printing or recording, such as carbon black. When the ink contains a colorant, the colorant content may preferably be 0.1–40 wt. parts, more preferably 1–20 wt. parts, per 100 wt. parts of the ink. Instead of or in combination with the colorant, a color-forming compound capable of generating a color under voltage application can be contained in the ink. The ink may further contain an electrolyte capable of providing electroconductivity to the ink, a thickening agent (or viscosity improver), a viscosity-reducing agent, or a surfactant. It is also possible to cause the above-mentioned fine particles per se to function as a colorant.

In order to obtain the ink according to the present invention, a liquid dispersion medium and fine particles as mentioned above may for example be mixed in an ordinary manner.

Next, there is described an ink of which adhesiveness is changed by the above-mentioned mechanism (3).

The ink used in the present invention may comprise a crosslinked substance (inclusive of polyelectrolyte) impregnated with a liquid dispersion medium.

Herein, the "crosslinked substance" refers to a single substance which per se can assume a crosslinked structure, or a mixture of a substance capable of assuming a crosslinked structure with the aid of an additive such as a crosslinking agent for providing an inorganic ion such as borate ion, and the additive. Further, the term "crosslinked structure" refers to a three-dimensional structure having a crosslinkage or crosslinking bond. The crosslinkage may be composed of any one or more of a covalent bond, an ionic bond, hydrogen a bond and a van der Waal's bond.

In the ink used in the present invention, the crosslinked structure is only required to be such that a desired degree of liquid dispersion medium-retaining property is given thereby. More specifically, the crosslinked structure may be any one of a network, a honeycomb, a helix, etc., or may be an irregular one.

The liquid dispersion medium in the ink used in the present invention may be any inorganic or organic liquid medium which is liquid at room temperature. The liquid medium should preferably have a relatively low volatility, e.g., one equal to or even lower than that of water.

In case where a hydrophilic dispersion medium such as water and an aqueous medium is used as the liquid dispersion medium, the crosslinked substance may preferably be composed of or from a natural or synthetic hydrophilic high polymer or macromolecular substance.

Examples of such a polymer include: plant polymers, such as guar gum, locust bean gum, gum arabic, tragacanth, carrageenah, pectin, mannan, and starch; microorganism polymers, such as xanthane gum, dextrin, succinoglucan, and curdran; animal polymers, such as gelatin, casein, albumin, and collagen; cellulose polymers such as methyl cellulose, ethyl cellulose, and hydroxyethyl cellulose; starch polymers, such as soluble starch, carboxymethyl starch, and methyl starch; alginic acid polymers, such as propylene glycol alginate, and alginic acid salts; other semisynthetic polymers, such as derivatives of polysaccharides; vinyl polymers, such as polyvinyl alcohol, polyvinylpyrolidone, polyvinyl methyl ether, carboxyvinyl polymer, and sodium polyacrylate; and other synthetic polymers, such as polyethylene glycol, ethylene oxide-propylene oxide block copolymer. These polymers may be used singly or in mixture of two or more species, as desired.

The hydrophilic polymer may preferably be used in a proportion of 0.2-50 wt. parts, particularly 0.5-30 wt. parts, with respect to 100 wt. parts of the liquid dispersion medium.

In the ink used in the present invention, a polyelectrolyte may preferably be used as the above-mentioned crosslinked substance. The "polyelectrolyte" used herein refers to a polymer or macromolecular substance having a dissociative group in the polymer chain (i.e., main chain or side chain) thereof.

Examples of a polyelectrolyte capable of providing a poly ion when dissociated in water may include, e.g., natural polymers such as alginic acid and gelatin; and synthetic polymers obtained by introducing a dissociative group into ordinary polymers, such as polystyrenesulfonic acid and polyacrylic acid. Among these polyelectrolytes, an amphoteric polyelectrolytes capable of being dissociated as either an acid or a base, such as a protein may preferably be used, in order to obtain a desired change in the ink adhesiveness based on electrical conduction.

On the other hand, when oil such as mineral oil or an organic solvent such as toluene is used as the liquid dispersion medium, the crosslinked substance may be composed of or from one or a mixture of two or more compounds selected from metallic soaps inclusive or metal stearates, such as aluminum stearate, magnesium stearate, and zinc stearate, and, similar metal salts of other fatty acids, such as palmitic acid, myristic acid, and lauric acid; or organic substances such as hydroxypropyl cellulose derivative, dibenzylidene-D-sorbitol, sucrose fatty acid esters, and dextrin fatty acid esters. These crosslinked substances may be used in the same manner as the above-mentioned hydrophilic polymers.

When the hydrophilic polymer, polyelectrolyte or metallic soap, etc., is used, the layer-forming property and liquid dispersion medium—retaining ability of the resultant ink vary to some extent depending on the formulation of these components or combination thereof with a liquid dispersion medium. It is somewhat difficult to determine the formulation or composition of these components in a single way. In the present invention, it is preferred to reduce the amount of a solvent contained in the ink or to enhance the crosslinking degree of the crosslinked substance, in order to obtain an ink which comprises a liquid dispersion medium and a crosslinked substance or polyelectrolyte and has substantially no adhesiveness. On the other hand, in order to obtain such an ink having an adhesiveness, it is preferred to increase the amount of a solvent contained in the ink, in a manner which is the reverse of that as mentioned above, or to reduce the crosslinking degree of the crosslinked substance.

The ink capable of changing its adhesiveness by the above-mentioned mechanism (3) essentially comprises a liquid dispersion medium and a crosslinked substance (inclusive of polyelectrolyte), as described above, and may further comprise, as desired, a colorant inclusive of dye, pigment and colored fine particles, a color-forming compound capable of generating a color under electric conduction, an electrolyte providing an electroconductivity to the ink, or another additive such as an antifugal agent or an antiseptic.

The colorant or coloring agent may be any of dyes and pigments generally used in the field of printing and recording, such as carbon black.

Further, in order to enhance the rubbing resistance of the resultant image, fine particles of an inorganic compound such as colloidal silica, titanium oxide and tin oxide may be added to the ink.

The ink used in the present invention may be obtained from the above components, for example, by uniformly mixing a liquid dispersion medium such as water, a crosslinked substance such as a hydrophilic polymer and/or an polyelectrolyte, and also an optional additive such as a crosslinking agent, a colorant, an electrolyte, etc., under heating as desired, to form a viscous solution or dispersion, which is then cooled to be formed into a gel state.

Incidentally, when colored particles such as toner particles are used as a colorant, it is preferred that a crosslinked substance and/or an polyelectrolyte, and a liquid dispersion medium are first mixed under heating to form a uniform liquid, and then the colored particles are added thereto. In this case, it is further preferred that the addition of the particles is effected in the neighborhood of room temperature so as to avoid the agglomeration of the particles.

The thus obtained ink, when subjected to electrical conduction, is at least partially subjected to a change in or destruction of the crosslinked structure to be reversibly converted from a gel state into a sol state, whereby it is selectively imparted with an adhesiveness corresponding to a pattern of the electrical conduction. Alternatively, the dissociation state of the polyelectrolyte contained in the ink may change, whereby the ink is selectively imparted with an adhesiveness corresponding to the electric conduction.

When the above-mentioned ink capable of changing its adhesiveness by the mechanism (3) is subjected to electrical conduction, the pH value of the ink in the neighborhood of an electrode may be changed by an electrochemical reaction. More specifically, the crosslinked structure or dissociative state of an electrolyte may be changed by electron transfer due to the electrode to thereby change the ink adhesiveness.

According to our knowledge, e.g., when a polyvinyl alcohol crosslinked with borate ions is used as the crosslinked substance, the change in the crosslinked structure caused by a pH change may be considered as follows.

Thus, when the borate ion bonded to the -OH groups of the polyvinyl alcohol,

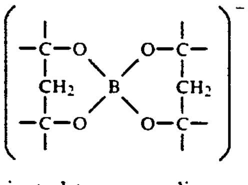

$H^+$ is subjected to an anodic reaction in the neighborhood of an anode (or the addition of an electron acceptor such as hydrochloric acid), the pH of the ink is changed to the acidic side and electrons may be removed from the above-mentioned borate ion to destroy at least a part of the crosslinked structure, the molecular weight is decreased and the viscosity is lowered, whereby the ink may be imparted with an adhesiveness selectively. The reaction at this time may presumably be expressed by the following formula:

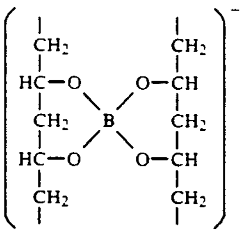

$+ 7/2H_2O$

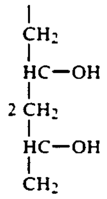

$+ H_3BO_3 + \frac{1}{2}O_2 + e^-$

Further, there is explained an embodiment wherein a change in the dissociation condition of a polyelectrolyte based on electric conduction is utilized. Thus, in a case where a peptide compound comprising at least one amino acid is used as the polyelectrolyte, when the pH of the ink is changed to the basic side due to the cathodic reaction in the neighborhood of a cathode based on electric conduction (or the addition of an electron donor), an $—NH_3+$ group of the amino acid is changed to an $—NH_2$ group. On the other hand, when the pH of the ink is changed to the acidic side due to the anodic reaction in the neighborhood of an anode based on electric conduction (or the addition of an electron acceptor), a —COO—group of the amino acid is changed to a —COOH group. Because of such a change in the dissociation condition of the amino acid, there may be caused a change in the crosslinked structure whereby a difference in the ink adhesiveness is provided.

According to our knowledge, the reaction at this time may presumably be expressed by the following formula:

$$\underset{\text{acidic pH side}}{H_3\overset{+}{N}RCOOH} \xleftarrow{(2)} \underset{\text{amino acid}}{H_3\overset{+}{N}RCOO^-} \xrightarrow{(1)} \underset{\text{basic pH side}}{H_2NRCOO^-}$$

(1): cathodic reaction based on electric conduction
(2): anodic reaction based on electric conduction As described hereinabove, according to the present invention, there is provided an image-forming method using an ink capable of changing its adhesiveness under electrical conduction, particularly an ink capable of partially or selectively transferring to a printing plate. In the image-forming method of the present invention, because the transfer-amount of the ink is controlled by the charge amount used for the electrical conduction, it is not necessary to regulate the amount of an ink by means of a large number of rollers as in a conventional printing machine.

Hereinbelow, the present invention will be explained with reference to the following Examples.

EXAMPLE 1

200 g of glycerin and 40 g of lithium taeniolite ($LiMg_2Li(Si_4O_{10})F_2$) having an average particle size of 2.5 microns were kneaded in a homogenizer at 10,000 rpm for 30 min., and then 200 g of water was added thereto and mixed by means of a roll mill to prepare a gray colloid sol ink in the form of an amorphous solid.

The thus obtained ink was applied on a stainless steel plate or board of 1 cm×1 cm plated with platinum to form an about 2 mm-thick ink layer, and another stainless steel plate plated with platinum having the same size as described above was disposed on the ink layer. Then, these two stainless steel plates were disposed vertically. Under no voltage application, when the spacing between these two stainless steel plates was gradually increased to separate these two stainless steel plates from each other, it was found that the ink adhered to almost the whole areas of the respective plates.

Then, a voltage of +30 V was applied between the above-mentioned two stainless steel plates plated with platinum sandwiching the 2 mm-thick ink layer, while one of the stainless steel plate was used as a cathode (earth) and the another was used as an anode. When the spacing between these two stainless steel plates was gradually increased to separate these two stainless steel plates from each other, while applying the voltage in the above-mentioned manner, it was found that substantially all of the ink adhered to the anode while substantially no ink adhered to the cathode, when these electrodes were observed with the naked eye.

Then, image formation was effected by means of a printing apparatus as shown in FIG. 1, wherein an ink-carrying roller 1 comprising a cylindrical roller of 30 mm in diameter having a surface of stainless steel coated with platinum plating (surface roughness: 1S) and a plate roller 3 comprising an iron cylindrical roller of 30 mm in diameter having a surface coated with hard chromium plating were used. In this apparatus, a printing plate 4 comprising an aluminum plate which had been subjected to patterning by using a vinyl-type resin was wound about the plate roller 3, and the above-mentioned ink material was disposed between the ink-carrying roller 1 and a coating roller 9.

The ink-carrying roller 1 was rotated in the arrow A direction at a peripheral speed of 5 mm/sec, and the gap between the ink-carrying roller 1 and the coating roller 9 comprising a cylindrical roller having a teflon rubber surface and rotating in the arrow E direction at a peripheral speed of 5 mm/sec was controlled so that a 0.2 mm-thick ink layer was formed on the ink-carrying roller 1. The plate roller 3 was rotated in the arrow C direction at a peripheral speed of 5 mm/sec in contact with the ink layer formed on the ink-carrying roller 1.

When printing operation was conducted by using such printing device, while no voltage was applied from a DC voltage supply 103, printed matter having an imagewise pattern was not obtained. On the other hand, when the printing operation was conducted while a DC voltage of 30 V was applied from the DC voltage supply 103, a large number of printed materials having a sharp image quality were obtained. In this printing operation, the plate roller 3 was used as a cathode and the ink-carrying roller 1 was used as an anode.

EXAMPLE 2

270 g of sodium taeniolite tetrasilicon mica ($NaMg_{2.5}(Si_4O_{10})F_2$) having an average particle size of 12 microns were gradually added to 180 g of glycerin in 20 min. in a homogenizer at 10,000 rpm under kneading, and then 10 g of water was added thereto in 1 min., and mixed by means of a roll mill to prepare a gray colloid sol ink in the form of an amorphous solid.

The thus obtained ink was sandwiched between two stainless steel plates plated with platinum. Under no voltage application, when the spacing between these two stainless steel plates plated with platinum was gradually increased to separate these two stainless steel plates from each other, it was found that substantially no ink adhered to the respective plates.

Then, a voltage of +30 V was applied between the above-mentioned two stainless steel plates plated with platinum sandwiching the ink layer, while one of the stainless steel plates was used as a cathode (earth) and the another was used as an anode. When the spacing between these two stainless steel plates plated with platinum was gradually increased to separate these two stainless steel plates from each other, while applying the voltage in the above-mentioned manner, it was found that substantially all of the ink adhered to the anode while substantially no ink adhered to the cathode.

Then, image formation was effected by means of a printing apparatus as shown in FIG. 1, in the same manner as in Example 1 except that the plate roller 3 side was used as an anode, whereby similar results as in Example 1 were obtained.

EXAMPLE 3

600 g of glycerin, 300 g of water, 50 g of carbon black (pigment, Stering SR, mfd. by Cabot Co., U.S.A.), and 100 g of polyvinyl alcohol (Gohsenol KP-08, mfd. by Nihon Gosei Kagaku Kogyo K.K.) were kneaded at 80° C. to dissolve the polyvinyl alcohol, and then 100 g of lithium taeniolite having an average particle size of 2.5 microns was added thereto and mixed by means of a roll mill to prepare an ink in the form of an amorphous solid.

When the thus obtained ink was subjected to image formation in the same manner as in Example 1 except that the plate roller 3 side was used as a cathode, similar results as in Example 1 were obtained.

EXAMPLE 4

| | |
|---|---|
| Colloidal silicate hydrate (swelling fine particles, trade name: Sumecton, mfd. by Kunimine Kogyo K.K., average particle size: below 1 micron) | 250 wt. parts |
| Carbon black (Stering SR, mfd. by Cabot Co., U.S.A.) | 60 wt. parts |
| Water | 140 wt. parts |
| Glycerin | 280 wt. parts |

Among the above-mentioned ingredients, water, glycerin and carbon black were first mixed by means of an attritor for 4 hours to prepare a mixture liquid, and then colloidal silicate hydrate was mixed therewith by means of a kneader to obtain an ink according to the present invention.

When the thus obtained ink was subjected to image formation by using the same printing apparatus as in Example 1 in the same manner as in Example 1 except that the plate roller 3 side was used as a cathode, similar results as in Example 1 were obtained.

EXAMPLE 5

| <Preparation of ink> | |
|---|---|
| Water | 50 wt. parts |
| Propylene glycol | 50 wt. parts |
| Polyvinyl alcohol (Gohsenol GL-03, mfd. by Nihon Gosei | 20 wt. parts |

-continued

| <Preparation of ink> | |
|---|---|
| Kagaku Kogyo K.K.) | |
| Carbon black (Stering SR, mfd. by Cabot Co., U.S.A.) | 10 wt. parts |
| Sodium borate (decahydrate) ($Na_2B_4O_7.10H_2O$) | 0.9 |
| 1N-aqueous sodium hydroxide solution | 4.5 |
| KI (electrolyte) | 20 |

The above ingredients were uniformly mixed under heating at 80° C. and then left standing at room temperature to obtain an ink in the form of a gel. It was supposed that in the thus obtained gel ink, —OH groups of the polyvinyl alcohol were crosslinked with borate ions.

<Image formation and printing>

The thus obtained into was subjected to image formation by using an image-forming apparatus as shown in FIG. 1.

In this apparatus shown in FIG. 1, the ink-carrying roller 1 composed a cylindrical stainless steel roller (diameter: 30 mm, surface roughness: 1S). Opposite to the ink-carrying roller 1, there was disposed a plate roller 3 comprising an iron cylindrical roller of 30 mm in diameter having a surface coated with hard chromium plating. A printing plate 4 comprising a copper plate coated with platinum plating which had been subjected to patterning by using a vinyl-type polymer was wound about the plate roller 3, and the above-mentioned ink material was disposed between the ink-carrying roller 1 and a coating roller 9 as an ink reservoir.

The ink-carrying roller 1 was rotated in the arrow A direction at a peripheral speed of 20 mm/sec, and the gap between the ink-carrying roller 1 and the coating roller 9 comprising a cylindrical roller having a teflon rubber surface and rotating in the arrow E direction at a peripheral speed of 20 mm/sec was controlled so that a 1.2 mm-thick ink layer was formed on the ink-carrying roller 1. The plate roller 3 was rotated in the arrow C direction at a peripheral speed of 20 mm/sec in contact with the ink layer formed on the ink-carrying roller 1.

When no current was passed between the printing plate 4 and the ink-carrying roller 1, a very slight amount of a solution was transferred to the printing plate 4, but the ink was not substantially transferred to the printing plate 4.

On the other hand, when a voltage of 30 V was applied through the layer of the ink 2 between the printing plate 4 disposed on the plate roller 3 as an anode and the ink-carrying roller 1 as a cathode, the ink 2 was selectively transferred to the printing plate 4 to form thereon an ink pattern.

The thus formed ink pattern was transferred to a blanket cylinder 5 having a surface of urethane rubber and rotating in the arrow C direction is contact with the printing plate 4. Then, the ink pattern was transferred to plain paper 7 movably sandwiched under pressure between the blanket cylinder 5 and an impression cylinder 6 having a surface of silicone rubber and rotating in the arrow D direction, whereby a recorded image having the same pattern as the electroconductive pattern of the printing plate 4 was obtained.

When 100 sheets of printed matter were continuously produced by repeating the above procedure, the resultant images were substantially the same as that of the above-mentioned initial image.

Further, when the above-mentioned procedure was repeated except that a voltage of 20 V was applied, there was obtained an image having a lower density, as a whole, than that in the case of application of a voltage of 30 V.

EXAMPLE 6

| <Preparation of ink> | |
|---|---|
| Ethylene glycol | 70 wt. parts |
| Water | 30 wt. parts |
| KI (electrolyte) | 20 wt. parts |
| Polyvinyl alcohol (Gohsenol GL-03, mfd. by Nihon Gosei Kagaku Kogyo K.K.) | 8 wt. parts |
| Anionic surfactant (trade name: Surflon S111, mfd. by Asahi Glass K.K.) | 1 wt. parts |
| Carbon black (Stering SR, mfd. by Cabot Co., U.S.A.) | 1 wt. parts |
| Borax ($Na_2B_4O_7.10H_2O$) | 0.5 wt. parts |

The above ingredients were uniformly mixed under heating at 75° C. and then left standing at room temperature to obtain an ink.

Image formation was effected in the same manner as in Example 5 except that the ink obtained in this instance was used, and a voltage was applied between the plate roller 3 as a cathode and the ink-carrying roller as an anode. As a result, there was formed an ink pattern wherein the ink adhered to the printing plate 4 except for the electroconductive pattern thereof, and an image reverse to that in Example 5 was obtained on plain paper 7.

When 100 sheets of printed matter were continuously produced by repeating the above procedure, the resultant images were substantially the same as that of the above-mentioned initial image.

As described hereinabove, according to the present invention, there is provided an image-forming method using a specific recording material capable of changing its adhesiveness depending on the polarity of a voltage applied thereto. In the present invention, because an image is formed by utilizing such an adhesiveness change, the recording material is excellent in environmental stability and the handling thereof is very easy.

Further, in the present invention, because a printing plate having a pattern is caused to selectively retain the recording material corresponding to the pattern, there may be obtained a high-quality image substantially without distortion.

What is claimed is:

1. An image forming method comprising the steps of:

providing a recording material with a characteristic adhesiveness that changes corresponding to a polarity of a voltage applied thereto, wherein said recording material is adhesive when no voltage is applied thereto and loses its adhesiveness when a voltage of said polarity is applied thereto;

positioning the recording material between a pair of electrodes, at least one of said electrodes comprising an electroconductive portion and an insulating portion in the form of a pattern corresponding to an objective image; and applying a voltage between the pair of electrodes to thereby attach the recording material to the electrode having the pattern corresponding to said objective image.

2. A method according to claim 1, which further comprises a step of transferring the recording material attached to the electrode having said pattern corresponding to said objective image to a transfer-receiving medium, thereby forming said objective image on said transfer-receiving medium.

3. An image forming apparatus comprising:

a pair of electrodes at least one of which comprises an electroconductive member, and a pattern of insulating material disposed on said electroconductive member;

means for supplying a recording material between said pair of electrodes;

means for applying a voltage between said pair of electrodes; and pressure application means for transferring to a transfer-receiving medium the recording material attached to the electrode having said pattern under application of said voltage.

4. An apparatus according to claim 3, which further comprises an intermediate transfer medium disposed between said pressure application means and the electrode having said pattern.

* * * * *